United States Patent
Cheng

(10) Patent No.: US 12,466,027 B2
(45) Date of Patent: Nov. 11, 2025

(54) PROCESSING SYSTEM OF SUSPENSION ABRASIVE JETS

(71) Applicant: INDUSTRIAL TECHNOLOGY RESEARCH INSTITUTE, Hsinchu (TW)

(72) Inventor: Pin-Tsung Cheng, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 437 days.

(21) Appl. No.: 18/070,634

(22) Filed: Nov. 29, 2022

(65) Prior Publication Data
US 2024/0123572 A1    Apr. 18, 2024

(30) Foreign Application Priority Data
Oct. 14, 2022   (TW) .................................. 111139070

(51) Int. Cl.
*B24C 1/04*   (2006.01)
*C09K 3/14*   (2006.01)

(52) U.S. Cl.
CPC ............ *B24C 1/045* (2013.01); *C09K 3/1409* (2013.01); *C09K 3/1472* (2013.01)

(58) Field of Classification Search
CPC ......... B24C 9/006; B24C 9/003; B24C 9/065; B24B 55/12
See application file for complete search history.

(56) References Cited

U.S. PATENT DOCUMENTS 727,030 A * 5/1903 Tilghman, Jr. ........ B24C 7/0046
451/100
4,505,077 A * 3/1985 Sheesley ................... B24C 3/04
451/99

(Continued)

FOREIGN PATENT DOCUMENTS

CN   104768710 B   9/2017
CN   110709209 A   1/2020

(Continued)

OTHER PUBLICATIONS

D.S. Miller, "Micromachining with abrasive waterjets", Journal of Materials Processing Technology, 2004, vol. 149, pp. 37-42.

(Continued)

*Primary Examiner* — Joel D Crandall
(74) *Attorney, Agent, or Firm* — Birch, Stewart, Kolasch & Birch, LLP

(57) ABSTRACT

The present disclosure provides a processing method of suspension abrasive jets, and the method comprises the following steps. Provide a workpiece on the processing machine. A suspension abrasive containing a plurality of abrasive particles with the same electrical property is provided in an abrasive suspension container. A non-aqueous fluid is supplied to the abrasive suspension container from a high pressure source. The workpiece is machined by jetting a suspension abrasive jet that couples a suspension abrasive and the non-aqueous fluid from a nozzle. The suspension abrasive and the non-aqueous fluid of the suspension abrasive jet are respectively recycled to the abrasive suspension container and the high pressure source by an abrasive separation and recycling device after the process.

9 Claims, 3 Drawing Sheets

(56) References Cited

U.S. PATENT DOCUMENTS

| | | | | |
|---|---|---|---|---|
| 5,239,787 | A | * | 8/1993 | Abbott ............... B24C 5/02 451/99 |
| 5,562,531 | A | * | 10/1996 | Yamaharu ............ B24C 9/00 451/100 |
| 5,800,246 | A | * | 9/1998 | Tomioka ............ B24C 9/006 451/100 |
| 6,224,463 | B1 | * | 5/2001 | Hartzell, Jr. .......... B24C 5/02 451/87 |
| 7,775,854 | B1 | * | 8/2010 | Boman ............ B24C 9/006 451/88 |
| 2021/0205956 | A1 | * | 7/2021 | Weickert ............ B24C 3/327 |

FOREIGN PATENT DOCUMENTS

| | | | | |
|---|---|---|---|---|
| CN | 110524442 | B | 2/2021 | |
| TW | 267123 | B | 1/1996 | |
| TW | 200927384 | A | 7/2009 | |
| TW | 201013745 | A | 4/2010 | |
| TW | M451658 | U1 | 4/2013 | |
| TW | M514902 | U | 1/2016 | |
| TW | I621590 | B | 4/2018 | |
| TW | I640586 | B | 11/2018 | |
| WO | WO-9920435 | A1 * | 4/1999 | ............ B08B 3/024 |
| WO | WO-2020158305 | A1 * | 8/2020 | ............ B24C 5/04 |

OTHER PUBLICATIONS

Grant et al., "Newtonian Jet Stability", A.I.Ch.E. Journal, Jul. 1966, vol. 12, No. 4, pp. 669-678.

Hashish, "A Model for Abrasive-Waterjet (AWJ) Machining", journal of Engineering Materials and Technology, 1989, Total 6 pages.

Lee et al., "Experimental and theoretical analysis of microjet droplet behavior", Microelectronic Engineering, 2007, vol. 84, pp. 1770-1774.

McCarthy, "Review of Stability of Liquid Jets and the Influence of Nozzle Design", The Chemical Engineering Journal, 1974, vol. 7, pp. 1-20.

Nguyen et al., "Effect of liquid properties on the stability of an abrasive waterjet", International Journal of Machine Tools & Manufacture, 2008, vol. 48, pp. 1138-1147.

Wang, "Abrasive Waterjet Machining of Engineering Materials", 2003, vol. 19, Total 4 pages.

Wu et al., "Effect of abrasive grain position patterns on the deformation of 6H-silicon carbide subjected to nano-grinding", International Journal of Mechanical Sciences, 2021, vol. 211, 106779, pp. 1-8.

Taiwanese Ofice Action and Search Report dated Sep. 20, 2023 for Application No. 111139070.

* cited by examiner

PROCESSING SYSTEM OF SUSPENSION ABRASIVE JETS

This application claims the benefit of Taiwan application Serial No. 111139070, filed on Oct. 14, 2022, the subject matter of which is incorporated herein by reference.

BACKGROUND OF THE DISCLOSURE

Field of the Disclosure

The disclosure relates in general to a processing method and a processing system, more particularly, to a processing method and a processing system of suspension abrasive jets.

Description of the Related Art

The conventional cutting equipment using suspension abrasive jets uses water to be pressurized by a high pressure source, and the pressurized aqueous fluid of the abrasive liquid has the problem of unable to be processed continuously. Also, because the conventional abrasive container has corners in its bottom contour, there is a problem of abrasive accumulation, so the process needs to be shut down. In addition, the conventional cutting equipment using aqueous abrasive jets does not further separate and recycle the abrasive, so that the abrasive particles cannot be made purer, finer and more high-value.

Therefore, how to solve the above-mentioned problems is that the skilled in the art strives to achieve.

SUMMARY OF THE DISCLOSURE

The present disclosure relates to a processing method and a processing system of a suspension abrasive jet, which utilizes a suspension abrasive containing a plurality of abrasive particles with the same electric charge to couple with a non-aqueous fluid to form a suspension abrasive jet to perform a process on a workpiece, and uses the abrasive separation and recycling device recycles the suspension abrasive and the non-aqueous fluid of the suspension abrasive jet, so as to solve the problems in the prior art that the continuous process may not be performed and the abrasive particles are not recycled, and to achieve the purpose of making the abrasive particles purer, finer and more high-value.

According to an aspect of the present disclosure, a processing method of suspension abrasive jets, and the processing method comprises the following steps. Provide a workpiece on the processing machine. A suspension abrasive containing a plurality of abrasive particles with the same electric charge is provided in an abrasive suspension container. A non-aqueous fluid is supplied to the abrasive suspension container from a high pressure source. The workpiece is machined by jetting a suspension abrasive jet that couples a suspension abrasive and the non-aqueous fluid from a nozzle. The suspension abrasive and the non-aqueous fluid of the suspension abrasive jet are respectively recycled to the abrasive suspension container and the high pressure source by an abrasive separation and recycling device after the process.

According to another aspect of the present disclosure, a processing system of suspension abrasive jets is provided, and it comprises a processing machine, an abrasive suspension container, a high pressure source, a nozzle and an abrasive separation and recycling device. The processing machine is for a workpiece provided thereon. The abrasive suspension container is configured to provide a suspension abrasive containing a plurality of abrasive particles with the same electric charge. The high pressure source is fluidly connected to the abrasive suspension container and is configured to supply a non-aqueous fluid to the abrasive suspension container. The nozzle is disposed on the processing machine and is configured to performing a process by jetting a suspension abrasive jet that couples a suspension abrasive and the non-aqueous fluid. The abrasive separation and recycling device is configured to recycle the suspension abrasive and the non-aqueous fluid of the suspension abrasive jet respectively to the abrasive suspension container and the high pressure source after the process.

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

Figure 1A:
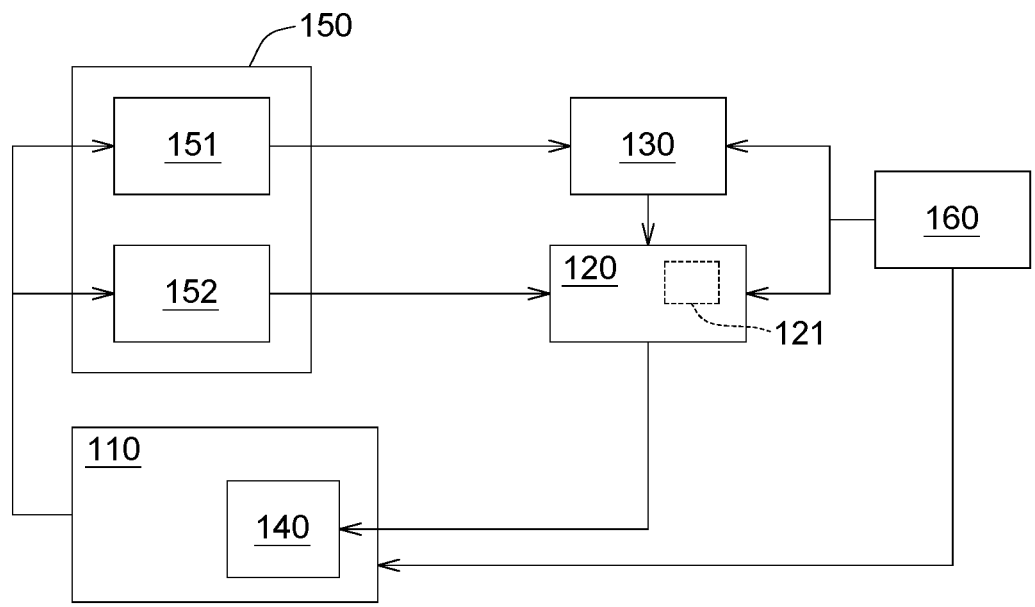
FIG. 1A is a block diagram of a processing system of suspension abrasive jets according to an embodiment of the present disclosure.

The embodiments of the present disclosure will be described in detail accompanied with the drawings as examples below. In addition to these detailed descriptions, the present disclosure may also be widely implemented in other embodiments, and any easy substitutions, modifications, and equivalent changes of any of the described embodiments are included within the scope of the present disclosure, and the subsequent claim scope prevail.

In the description of the specification, numerous specific details are provided in order to provide the reader with a more complete understanding of the present disclosure; however, the present disclosure may be practiced without some or all of these specific details. Also, well-known and common steps or elements have not been described in detail to avoid unnecessarily limiting the disclosure. The same or similar elements in the drawings will be represented by the same or similar symbols. It should be noted that the drawings are for illustrative purposes only, and do not represent the actual size or number of elements unless otherwise specified.

Figure 1B:
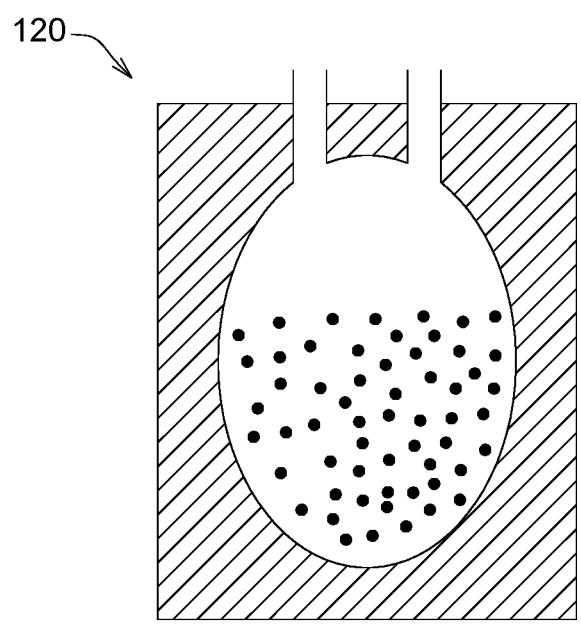
FIG. 1B is a contour diagram of an abrasive suspension container of a processing system of suspension abrasive jets according to an embodiment of the present disclosure.

Please refer to FIG. 1A to FIG. 1B. FIG. 1A shows a block diagram of a processing system 100 of suspension abrasive jets according to an embodiment of the present disclosure. FIG. 1B shows a contour diagram of an abrasive suspension container 120 of a processing system 100 of suspension abrasive jets according to an embodiment of the present disclosure.

The processing system 100 may comprise a processing machine 110, an abrasive suspension container 120, a high pressure source 130, a nozzle 140, and an abrasive separation and recycling device 150. The processing machine 110 is, for example, a cutting device using a high-energy jet, which may be for a workpiece provided thereon. The high pressure source 130 is, for example, a high pressure pump, which may be fluidly connected to the abrasive suspension container 120 and configured to provide a non-aqueous fluid to the abrasive suspension container 120, namely, the processing system 100 of this embodiment uses a non-aqueous liquid to be pressurized by a high pressure source. The nozzle 140 is, for example, a nozzle for cutting, which may be arranged on the processing machine 110 and configured to perform a beam-cutting on the workpiece, namely the nozzle 140 may be configured to eject a jet of suspension abrasive that couples the suspension abrasive provided by the abrasive suspension container 120 with the non-aqueous fluid pressurized by the high pressure source 130 to perform a process on the workpiece.

Specifically, the abrasive suspension container 120 may be configured to provide a suspension abrasive containing a plurality of abrasive particles with the same electric charge, so the abrasive particles are mutually repelled due to the same electric charge. As such, the suspension abrasives in the abrasive suspension container 120 may be suspended. For example, the abrasive suspension of the abrasive suspension container 120 is, for example, a high polymer abrasive, such as silicon carbide, diamond, graphene, boron carbide, zirconia, corundum, tungsten carbide, titanium carbide, strontium quartz, boron, boron nitride, bismuth Rhenium boride or titanium diboride etc. In addition, the method of making the abrasive particles have the same electricity, for example, is the semiconductor doping technology which is configured to make the surface of the abrasive particles to be P-pole, or a method of using the polymer surface anti-adhesion treatment scanning technology. Further, for example, the suspension abrasive with a Mohs scale of mineral hardness of 9 or more may be selected for the processing system 100 of the present embodiment. In addition, the processing system 100 may further comprises a paddle component 121, the paddle component 121 may be disposed in the abrasive suspension container 120, and the paddle component 121 may be configured to agitate the suspension abrasive in the abrasive suspension container 120, so as to assist in physically driving the abrasive particles. As such, the suspension effect may be better.

As shown in FIG. 1B, the abrasive suspension container 120 may be configured to have a flat bottom contour, for example, an oval or circular contour. The abrasive particles with the same electric charge of the suspension abrasive are dispersed and uniformly distributed therein due to mutual repulsion of electric charge. Through the flat bottom contour, the problem of abrasive particles accumulating at the bottom of the abrasive suspension container 120 may be avoided. The abrasive separation and recycling device 150 is connected to the processing machine 110. After the workpiece is processed by the nozzle 140 on the processing machine 110, the abrasive separation and recycling device 150 may be configured to recycle the suspension abrasive and the non-aqueous fluid of the suspension abrasive jet respectively to the abrasive suspension container 120 and the high pressure source 130 after the process.

In one embodiment, the nozzle 140 may also have the same electric charge as the abrasive particles of the suspension abrasive in the abrasive suspension container 120, so that through the electrical repulsion between the nozzle 140 and the abrasive particles, the jet of suspension abrasive passes through the nozzle 140 more quickly and reduces the wear and tear of the nozzle 140, thereby increasing the life of the nozzle 140. In addition, the nozzle 140 has a diameter ratio of 3 to 20 to that of the abrasive particle. In another embodiment, the high pressure source 130 is configured to apply a pressure, for example, greater than 10,000 psi and further between 25,000 and 40,000 psi, to the non-aqueous fluid.

The processing system 100 may further comprises a controller 160, such as a PLC controller or a CNC controller, which may be connected to the processing machine 110, the abrasive suspension container 120 and the high pressure source 130, thereby controlling the nozzle 140 on the processing machine 110 to perform the process, controlling the high pressure source 130 to carry out a pressurized transportation of the non-aqueous fluid, and controlling the paddle component 121 of the abrasive suspension container 120 to rotate and agitate the suspension abrasive. The controller 160 may further be configured to measure the concentration of the suspension abrasive relative to the non-aqueous fluid, and may further monitor the concentration to be between 5.0 g/l and 30.0 g/l. In addition, the controller 160 may be further configured to measure a ratio of the volume flow rate of the suspension abrasive to the non-aqueous fluid in the suspension abrasive jet, and may monitor the ratio of the volume flow rate to be between 35% and 65%.

Figure 2A:
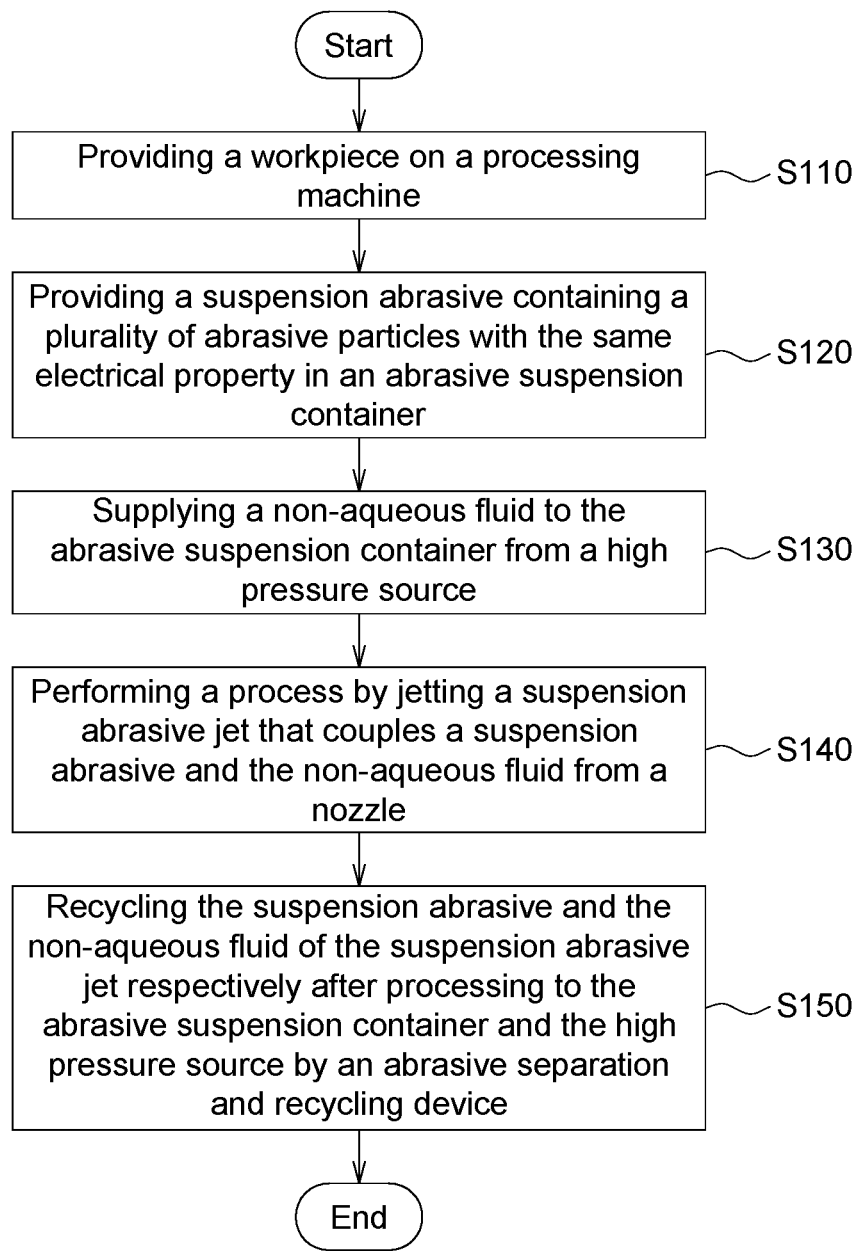
FIG. 2A is a flow chart of a processing method of suspension abrasive jets according to an embodiment of the present disclosure.

Please refer to FIG. 2A. FIG. 2A shows a flowchart of a processing method of suspension abrasive jets according to an embodiment of the present disclosure.

In this embodiment, the following processing method of suspension abrasive jets is a program or an electronic circuit and is performed by the processing system 100 of the suspension abrasive jets shown in FIG. 1A, and the steps are described below. In the step S110, provides a workpiece on the processing machine 110. In the step S120, provides a suspension abrasive containing a plurality of abrasive particles with the same electric charge in the abrasive suspension container 120. In the step S130, supplies a non-aqueous fluid to the abrasive suspension container 120 from the high pressure source 130. In the step S140, performs a process by jetting a suspension abrasive jet that couples a suspension abrasive and the non-aqueous fluid from the nozzle 140. In the step S150, recycles the suspension abrasive and the non-aqueous fluid of the suspension abrasive jet respectively to the abrasive suspension container 120 and the high pressure source 130 by the abrasive separation and recycling device 150 after the process, so that the suspension abrasive and the non-aqueous fluid may be reused.

The step S110 may further comprises configuring the abrasive suspension container 120 to have a flat bottom contour, so as to avoid the problem that the abrasive particles accumulates at the bottom of the abrasive suspension container 120. In addition, the step S110 may further comprises agitating the suspension abrasive in the abrasive suspension container 120 with a paddle component 121.

The step S120 may further comprises selecting the suspension abrasive with a Mohs scale of mineral hardness of 9 or more. In addition, the step S120 may further comprises selecting the suspension abrasive from silicon carbide, diamond, graphene, boron carbide, zirconia, corundum, tungsten carbide, titanium carbide, quartz, boron, boron nitride, rhenium diboride or titanium diboride, etc.

The step S130 may further comprises configuring the high pressure source 130 to apply a pressure greater than 10,000 psi to the non-aqueous fluid. For example, the pressure applied to the non-aqueous fluid by the high pressure source 130 may be between 25,000 to 40,000 psi. In addition, the step S130 may further comprises configuring the concentration of the suspension abrasive relative to the non-aqueous fluid to be between 5.0 g/l-30.0 g/l.

The step S140 may further comprises configuring the nozzle 140 to have the same electric charge as the abrasive particles. In addition, the step S140 may further comprises configuring the nozzle to have a diameter ratio of 3 to 20 to that of the abrasive particles. Moreover, the step S140 may further comprises configuring the ratio of volume flow rate of the suspension abrasive to the non-aqueous fluid in the suspension abrasive jet to be between 35% and 65%.

Figure 2B:
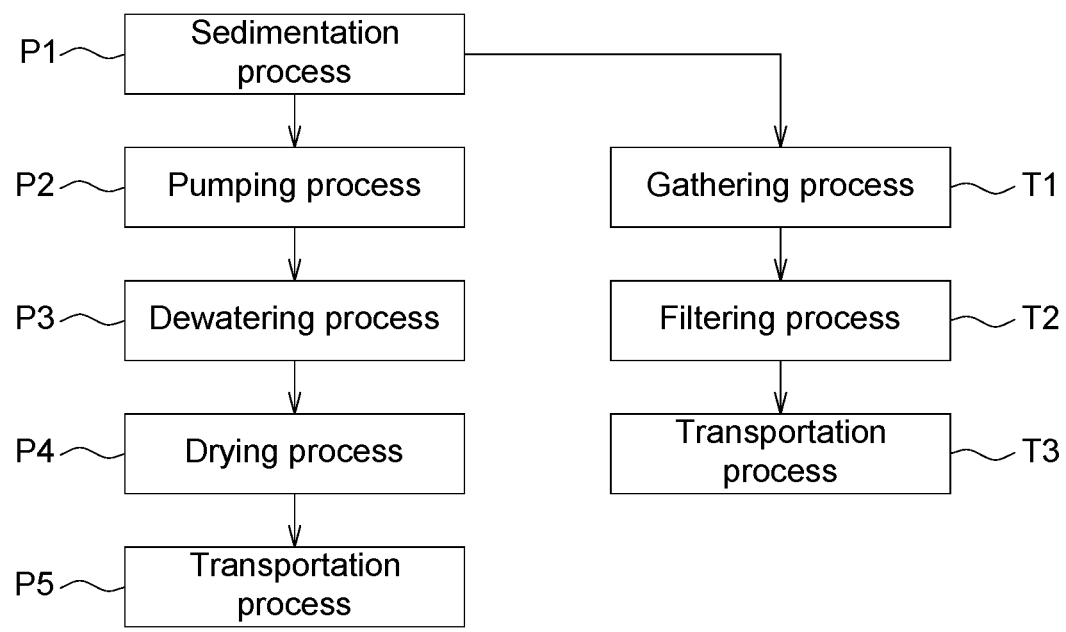
FIG. 2B is a flow chart of the separation and recycling treatment in the processing method of suspension abrasive jets according to the embodiment of the present disclosure.

Please refer to FIG. 2B. FIG. 2B shows a flow chart of the step S150 of separation and recycling treatment in the processing method of suspension abrasive jets according to the embodiment of the present disclosure.

In the step S150, the suspension abrasive and the non-aqueous fluid of the suspension abrasive jet are recycled respectively to the abrasive suspension container 120 and the high pressure source 130 by the abrasive separation and recycling device 150 after the process of the processing machine 110. Referring to FIG. 1A, the abrasive separation and recycling device 150 may include a waste liquid recycling unit 151 and a waste particle recycling unit 152. Both the waste liquid recycling unit 151 and the waste particle recycling unit 152 are connected to the processing machine 110. After the process of the processing machine 110, the suspension abrasive jets may be sequentially subjected to a sedimentation process P1, then a pumping process P2, followed by a dewatering process P3, then a drying operation P4 optionally, and finally a transportation process P5 to the waste particle recycling unit 152. The waste particle recycling unit 152 returns the waste abrasive particles subjected to the above-mentioned processes P1-P5 to the abrasive suspension container 120 for reuse. In one embodiment, the drying process P4 can also be omitted, namely, after the dewatering process P3 is completed, the transportation process P5 is then performed.

Also, when the sedimentation process P1 is carried out on the suspension abrasive jet flow after the process of the processing machine 110, a part of the waste liquid will overflow, a corresponding gathering process T1 to the overflowed waste liquid may be carried out in sequence, and then a filtering process T2 is carried out. Afterwards, a transportation process T3 is finally performed to transport the waste liquid to the waste liquid recycling unit 151. The waste liquid recycling unit 151 returns the waste fluid subjected to the above-mentioned processes T1-T3 to the high pressure source 130 for reuse.

According to the processing method and the processing system of suspension abrasive jets of the above-described embodiment, the suspension abrasive and the non-aqueous fluid containing a plurality of abrasive particles with the same electric charge may be used to couple into the suspension abrasive jet. The workpiece is processed, and the suspension abrasive and non-aqueous fluid of the suspension abrasive jet are recycled by the abrasive separation and recycling device, so as to solve the problems of inability to continuous process, no recycling of abrasive particles and rapid wear of the nozzle in the prior art, and to achieve the purpose of making the abrasive particles purer, finer and more high-value.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A processing system of suspension abrasive jets, comprising:
    an abrasive suspension container configured to provide a suspension abrasive containing a plurality of abrasive particles, wherein the processing system further comprises the abrasive particles, each of the abrasive particles has an electric charge same as an electric charge of each of the other abrasive particles;
    a high pressure source, fluidly connected to the abrasive suspension container and configured to supply a non-aqueous fluid to the abrasive suspension container, wherein the suspension abrasive and the non-aqueous fluid are coupled; and
    a nozzle configured to perform a process on a workpiece using the coupled suspension abrasive and non-aqueous fluid, wherein the nozzle has an electric charge same as the electric charge of the abrasive particles.

2. The processing system of suspension abrasive jets according to claim 1, wherein the abrasive suspension container has a flat bottom contour.

3. The processing system of suspension abrasive jets according to claim 1, wherein the nozzle has a diameter, a ratio of the diameter of the nozzle to a diameter of each of the abrasive particles is between 3 to 20.

4. The processing system of suspension abrasive jets according to claim 1, wherein the processing system further comprises the suspension abrasive, the suspension abrasive with a Mohs scale of mineral hardness of 9 or more is selected.

5. The processing system of suspension abrasive jets according to claim 1, wherein the processing system further comprises the suspension abrasive, the suspension abrasive is selected from silicon carbide, diamond, graphene, boron carbide, zirconia, corundum, tungsten carbide, titanium carbide, quartz, boron, boron nitride, rhenium diboride or titanium diboride.

6. The processing system of suspension abrasive jets according to claim 1, wherein the high pressure source is configured to supply the non-aqueous fluid at a pressure greater than 10,000 psi.

7. The processing system of suspension abrasive jets according to claim 1, wherein the processing system further comprises the suspension abrasive and the non-aqueous fluid, a concentration of the suspension abrasive relative to the non-aqueous fluid is configured to be between 5.0 g/l-30.0 g/l.

8. The processing system of suspension abrasive jets according to claim 1, wherein the processing system further comprises the suspension abrasive and the non-aqueous fluid, a ratio of a volume flow rate of the suspension abrasive to a volume flow rate of the non-aqueous fluid in the suspension abrasive jet is configured to be between 35% and 65%.

9. The processing system of suspension abrasive jets according to claim 1, further comprising:
    a paddle component disposed in the abrasive suspension container.

* * * * *